UNITED STATES PATENT OFFICE.

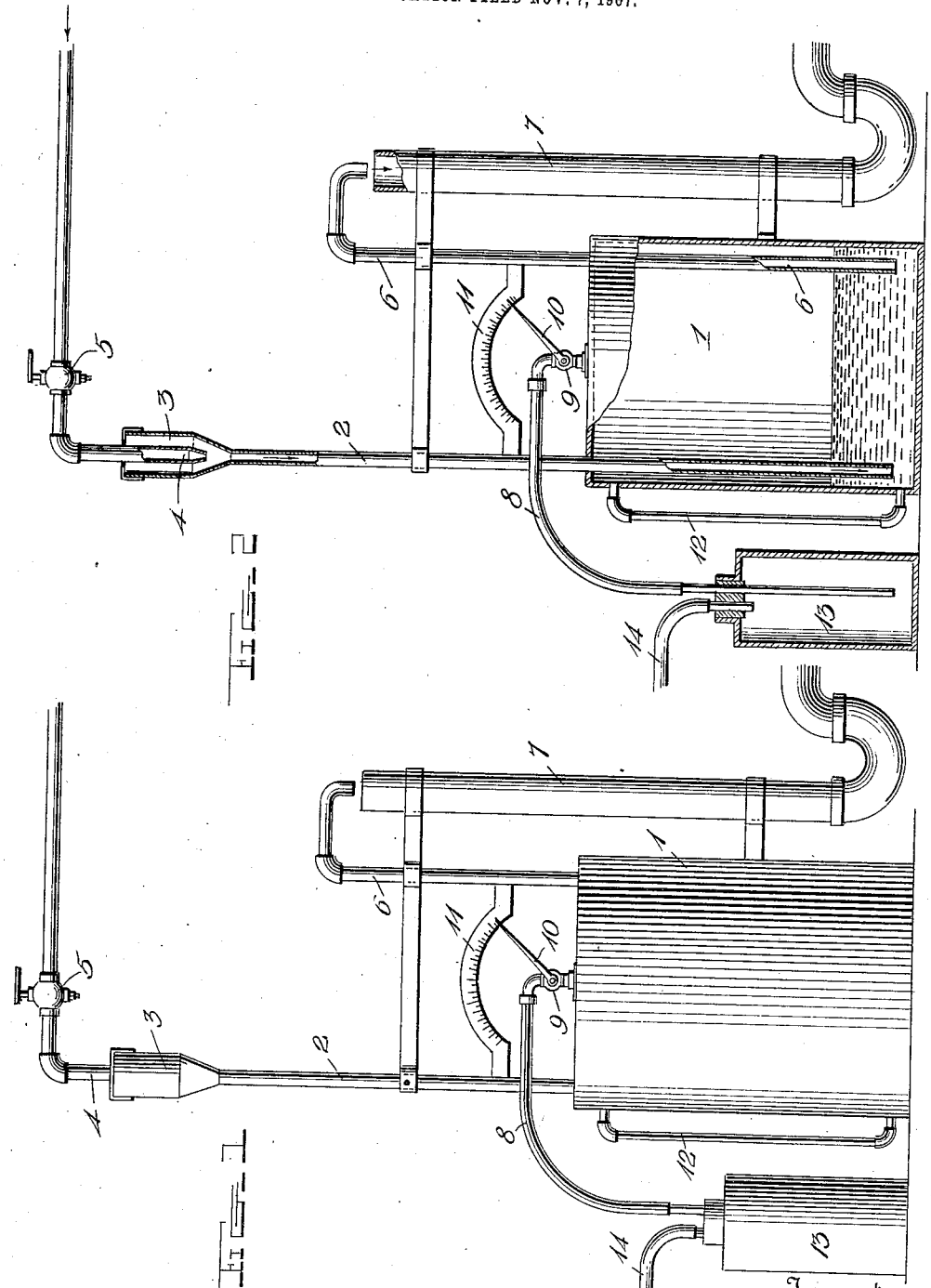

JOHN B. RIDOUT, OF ST. PAUL, MINNESOTA, ASSIGNOR OF ONE-THIRD TO DUDLEY CROWTHER AND ONE-THIRD TO W. H. BARTH.

HYDRAULIC AIR-PUMP.

No. 898,264. Specification of Letters Patent. Patented Sept. 8, 1908.

Application filed November 7, 1907. Serial No. 401,142.

*To all whom it may concern:*

Be it known that I, JOHN B. RIDOUT, a citizen of the United States, residing at St. Paul, in the county of Ramsey and State of Minnesota, have invented certain new and useful Improvements in Hydraulic Air-Pumps; and I do declare the following to be a full, clear, and exact description of the invention, such as will enable others skilled in the art to which it appertains to make and use the same.

My invention relates to devices for compressing air by hydraulic power, and has for its object to provide a simple and easily constructed apparatus by means of which air may be compressed with a minimum of expense and attention.

A few of the applications of my invention may be cited as for forcing a current of air through a hydrocarbon, for heating or lighting purposes, in metallurgical laboratories, for blow-pipe analyses, in smelters, in forges, in mining, in pneumatic cleaning, in the cyanid process of procuring gold where air is injected into the solution to supply oxygen and for supplying wind automatically to church organs.

An embodiment of my invention is shown in the apparatus illustrated in the accompanying drawing, although the construction and relative size therein shown are merely illustrative and may be greatly varied without departing from the spirit and scope of the invention.

In the drawing, in which like reference characters refer to similar parts throughout the several figures, Figure 1 is a side elevation; and Fig. 2 is a vertical sectional view.

As shown the apparatus comprises an inclosed cylindrical vessel 1 which may be of material of sufficient strength to withstand the pressure employed, and a vertically extending feed pipe, 2, extending from near the bottom of the cylinder up a sufficient distance above the top of the same according to the water and air pressure used. The feed pipe 2 is provided with a flared portion 3 at its upper end, as shown. Extending downwardly into this flared portion and co-axially therewith is a pointed cylindrical jet nozzle, 4, provided with a spray cock, 5, communicating with a water supply as shown. Extending upwardly from near the bottom and through the top of the vessel 1 to nearly the height of the pipe 2, is a waste pipe, 6, having its upper end elbowed and downwardly turned into a water pipe 7. A third opening is provided through the top of the vessel 1, wherein is secured one end of a pipe 8 for conducting the compressed air to a reservoir or accumulator or directly to its point of application.

To control the flow of air through the pipe 8, I provide a valve, 9, having a finger 10 to indicate on a scale, 11, the amount the valve 9 is opened thereby to accurately control the flow of air. A water gage, 12, of any preferred type completes the essential equipment, although the air pipe 8 may be connected to a trap 13 to catch the accidental overflow of water, although this trap would be unnecessary if the air is to be delivered above the level of the upper end of the pipe 2. A pipe 14 conducts the air to a reservoir, not shown, or if convenient directly to the point where the air is to be used.

In operation, the water is emitted from the jet nozzle 4 with great velocity and entrains and carries down with it bubbles of air through the bottom of the feed pipe 2. The air rises to the top of the vessel 1 and may be passed down through the pipe 8. The water at the same time is forced out through the waste pipe 6. The waste pipe must not quite reach the height of the top of the pipe 2, as the weight of the water in the waste pipe would tend to act against the water in the pipe 2. Careful adjustment of the stop cocks 5 and 9 permits the level of the water in the vessel 2 to be kept constantly a short distance from the bottom.

Having described my invention, what I claim as new and desire to secure by Letters-Patent, is:

1. In a device of the class described, a cylinder, a feed water pipe, a water outlet pipe extending upwardly from said cylinder, an indicator scale bridged between said pipes to brace the same, a waste pipe, a support from the cylinder to the waste pipe, and a brace extending above the indicator scale and connecting the feed water pipe, the outlet pipe and the waste pipe and to brace all of said pipes.

2. In a device of the class described, a cylinder, a feed water pipe, a water outlet pipe extending upwardly from said cylinder, an indicator scale bridged between said pipes to brace the same, a waste pipe, a support from the cylinder to the waste pipe, a brace extending above the indicator scale and connecting the feed water pipe, the outlet pipe and the waste pipe and to brace all of said pipes, a gas outlet valve, and a pointer secured to the movable part of said valve to work over the scale.

In testimony whereof I have hereunto set my hand in presence of two subscribing witnesses.

JOHN B. RIDOUT.

Witnesses:
WALTER L. CHAPIN,
ANNA A. LINDSTROM.